United States Patent
Russell et al.

(10) Patent No.: US 9,445,232 B2
(45) Date of Patent: *Sep. 13, 2016

(54) OBSERVATION PLATFORM FOR USING STRUCTURED COMMUNICATIONS

(71) Applicant: Theatro Labs, Inc., Dallas, TX (US)

(72) Inventors: Steven Paul Russell, Menlo Park, CA (US); Guy R. VanBuskirk, Spicewood, TX (US); Andrew W. Kittler, Atherton, CA (US)

(73) Assignee: Theatro Labs, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,473

(22) Filed: Dec. 16, 2014

(65) Prior Publication Data

US 2015/0105061 A1  Apr. 16, 2015

Related U.S. Application Data

(63) Continuation of application No. 13/401,146, filed on Feb. 21, 2012, now Pat. No. 8,948,730.

(60) Provisional application No. 61/445,504, filed on Feb. 22, 2011, provisional application No. 61/487,432, filed on May 18, 2011.

(51) Int. Cl.
*H04W 24/00* (2009.01)
*H04W 4/02* (2009.01)
(Continued)

(52) U.S. Cl.
CPC ....... *H04W 4/021* (2013.01); *G06Q 10/06398* (2013.01); *G10L 15/26* (2013.01);
(Continued)

(58) Field of Classification Search
CPC .......... G06K 7/10366; G06Q 10/06398; G06Q 30/0261; H04W 4/12; H04W 4/02; H04W 40/20; H04L 65/4076
USPC ............. 455/412.1, 456.3, 457, 456.6, 445; 348/207.1; 705/14.58
See application file for complete search history.

(56) References Cited

U.S. PATENT DOCUMENTS 6,301,573 B1  10/2001  McIlwaine et al.
6,377,927 B1   4/2002  Loghmani et al.
(Continued)

FOREIGN PATENT DOCUMENTS

WO    0210926 A1    2/2002

OTHER PUBLICATIONS

"Extended Supplementary Search Report App # 14160323.3", Jun. 18, 2014, 6 pages.
(Continued)

*Primary Examiner* — Phuoc H Doan

(57) ABSTRACT

Systems and methods for using structured communications in an observation platform are disclosed. A signal is received from a first communication device at a second communication device associated with a computer system wherein a first characteristic of the signal corresponds to an audible source and a second characteristic of the signal corresponds to information indicative of a geographic position of the first communication device, and wherein the second communication device is associated with a radio range. A first user associated with the first communication device is recognized at the computer system. Context information is derived for the signal at the computer system. The signal is relayed to a destination derived from the context information via a network, wherein the destination is outside of the radio range of the second communication device.

22 Claims, 9 Drawing Sheets

(51) Int. Cl.
*H04W 4/20* (2009.01)
*G10L 15/26* (2006.01)
*G10L 17/22* (2013.01)
*H04B 7/14* (2006.01)
*H04M 3/02* (2006.01)
*G06Q 10/06* (2012.01)
*H04L 29/08* (2006.01)

(52) U.S. Cl.
CPC .............. *G10L 17/22* (2013.01); *H04B 7/14* (2013.01); *H04M 3/02* (2013.01); *H04W 4/02* (2013.01); *H04W 4/20* (2013.01); *H04L 67/327* (2013.01)

(56) References Cited

U.S. PATENT DOCUMENTS

| | | |
|---|---|---|
| 6,928,343 B2 | 8/2005 | Cato |
| 6,937,998 B1 | 8/2005 | McGlynn et al. |
| 6,996,531 B2 | 2/2006 | Korall et al. |
| 7,248,881 B2 | 7/2007 | Shostak |
| 7,397,368 B2 | 7/2008 | Otto et al. |
| 7,656,295 B2 | 2/2010 | Robson et al. |
| 7,748,618 B2 | 7/2010 | Vawter |
| 7,925,777 B2 | 4/2011 | Levett |
| 8,060,412 B2 | 11/2011 | Rosenbaum et al. |
| 8,140,340 B2 | 3/2012 | Bhogal et al. |
| 8,179,872 B2 | 5/2012 | Bienfait et al. |
| 8,180,377 B2 | 5/2012 | Yang et al. |
| 8,183,996 B2 | 5/2012 | Toyokawa et al. |
| 8,271,188 B2 | 9/2012 | De Koning |
| 8,352,260 B2 | 1/2013 | Sung et al. |
| 8,369,505 B2 | 2/2013 | Vuong |
| 8,473,289 B2 | 6/2013 | Jitkoff et al. |
| 8,630,851 B1 | 1/2014 | Hertschuh et al. |
| 8,699,694 B2 | 4/2014 | Chishti et al. |
| 8,798,036 B2 | 8/2014 | Kūt et al. |
| 8,948,730 B2 | 2/2015 | Vanbuskirk et al. |
| 9,042,921 B2 | 5/2015 | Karmarkar |
| 9,053,449 B2 | 6/2015 | Kumar et al. |
| 2002/0143548 A1 | 10/2002 | Korall et al. |
| 2005/0021838 A1 | 1/2005 | Levett |
| 2005/0221264 A1 | 10/2005 | Hearn et al. |
| 2006/0071775 A1 | 4/2006 | Otto et al. |
| 2007/0046458 A1 | 3/2007 | Toyokawa et al. |
| 2008/0041937 A1 | 2/2008 | Vawter |
| 2008/0154612 A1 | 6/2008 | Evermann et al. |
| 2008/0159271 A1 | 7/2008 | Kutt et al. |
| 2008/0279133 A1 | 11/2008 | Bienfait et al. |
| 2009/0003309 A1 | 1/2009 | Bawcutt et al. |
| 2009/0005972 A1 | 1/2009 | de Koning |
| 2010/0009698 A1 | 1/2010 | Yang et al. |
| 2010/0054526 A1 | 3/2010 | Eckles |
| 2010/0070268 A1 | 3/2010 | Sung et al. |
| 2011/0022642 A1 | 1/2011 | Demilo et al. |
| 2011/0072154 A1 | 3/2011 | Bogdanovic et al. |
| 2011/0093818 A1 | 4/2011 | Sathish |
| 2011/0201356 A1 | 8/2011 | George et al. |
| 2011/0202466 A1 | 8/2011 | Carter |
| 2011/0205053 A1 | 8/2011 | Chen et al. |
| 2011/0255680 A1 | 10/2011 | Vuong |
| 2012/0034590 A1 | 2/2012 | Hallsten et al. |
| 2012/0151380 A1 | 6/2012 | Bishop |
| 2013/0040600 A1 | 2/2013 | Reitnour et al. |
| 2013/0060568 A1 | 3/2013 | Russell et al. |
| 2013/0073388 A1 | 3/2013 | Heath |
| 2013/0130207 A1 | 5/2013 | Russell et al. |
| 2013/0196706 A1 | 8/2013 | Patel et al. |
| 2013/0204972 A1 | 8/2013 | Russell et al. |
| 2013/0204998 A1 | 8/2013 | Russell et al. |
| 2014/0052676 A1 | 2/2014 | Wagner et al. |
| 2014/0148210 A1 | 5/2014 | Kundu et al. |
| 2014/0316779 A1 | 10/2014 | Russell et al. |
| 2014/0316898 A1 | 10/2014 | Russell et al. |
| 2015/0065149 A1 | 3/2015 | Russell et al. |
| 2015/0106167 A1 | 4/2015 | Russell et al. |
| 2015/0113098 A1 | 4/2015 | Vanbuskirk et al. |
| 2015/0213382 A1 | 7/2015 | Russell et al. |
| 2015/0269869 A1 | 9/2015 | Russell et al. |

OTHER PUBLICATIONS

"International Search Report PCT/2012/025984", Dec. 22, 2012, 9 pages.
Arbanowski, "I-Dentric Communications: Personalization, Ambient Awareness and Adaptability for Future Mobile Services", IEEE Communications Magazine, Sep. 2004, 7 pages.
Rao, "Geographic Routing without Location Information", 9th Annual International Conference on Mobile Computing and Networking, Sep. 2003, 13 pages.

OBSERVATION PLATFORM FOR USING STRUCTURED COMMUNICATIONS

RELATED APPLICATIONS

This application claims priority and is a continuation to the co-pending patent application Ser. No. 13/401,146, entitled "OBSERVATION PLATFORM FOR USING STRUCTURED COMMUNICATIONS," with filing date Feb. 21, 2012, and assigned to the assignee of the present invention, which is herein incorporated by reference in its entirety.

The application with Ser. No. 13/401,146 claims priority to the then provisional patent application, Ser. No. 61/445,504, entitled "ENABLING A RETAIL SALES/SERVICE PROVIDER TO INTERACT WITH ON-PREMISE CUSTOMERS," with filing date Feb. 22, 2011, and assigned to the assignee of the present invention. The application with Ser. No. 13/401,146 incorporated the Provisional Patent Application 61/445,504 in its entirety by reference.

The application with Ser. No. 13/401,146 also claims priority to the provisional patent application, Ser. No. 61/487,432, entitled "ACTIVITY COORDINATING ASSOCIATE'S AUTOMATIC SERVICE ASSISTANT," with filing date May 18, 2011, and assigned to the assignee of the present invention. The application with Ser. No. 13/401,146 incorporated the Provisional Patent Application 61/487,432 in its entirety by reference.

BACKGROUND

Retailers are under constant pressure to cut costs, improve margins, and increase floor traffic and customer satisfaction. This has always been so, but the rise of the internet, available at home and while mobile, has increased the pressure greatly. Loyalty programs and per-customer pricing, such as special discounts, are one set of tools used in the past, and used more. Moreover, there is an increased demand to manage and train associates and provide an increased measure of customer satisfaction in a retail environment. Such concerns also extend to situations and environments besides retail settings. Modern communication devices provide for many communication opportunities in retail and other settings.

Figure 1A:
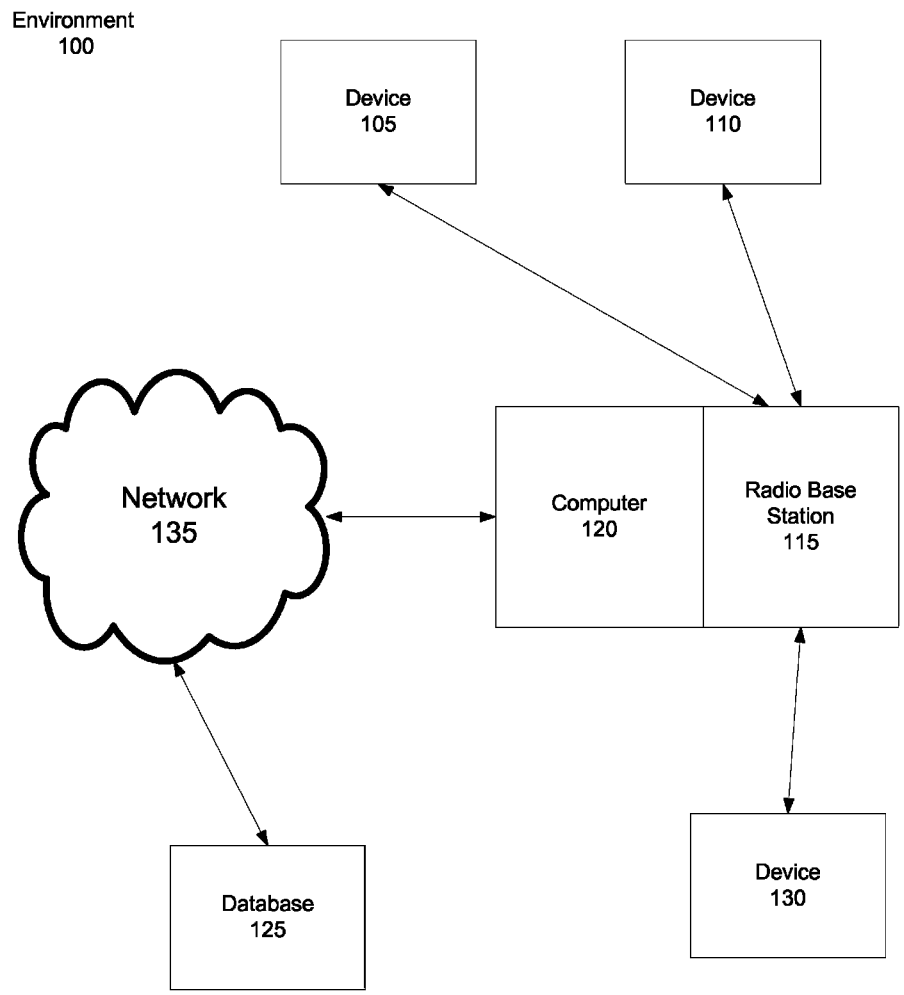
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "recognizing," "deriving," "storing," "relaying," "executing," "generating," "determining," "tracking," "recording," "identifying," "making," or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Using Structured Communications in an Observation Platform

Embodiments of the present technology are for structuring communications in an observation platform. The observation platform may involve a number of users or people and provides structure and discipline communications for the users and captures data regarding the communications such as performance metrics. The present technology may be employed in various environments such as retail settings, public-stage floors, outdoor venues, concerts, police scenarios, disaster areas, schools, sporting events, hospitality operations, security operations, military operations, and other environments where communications occur between users.

Using structuring communications in an observation platform, as referred to herein, may refer to the following actions regarding communications between two or more users: disciplining, structuring, controlling, participating, discouraging, encouraging, influencing, nudging, making an example of, permitting, managing, managing to be in compliance with policies, measuring what goes on as a communication occurs, characterizing, enabling, observing, recording, correcting, directing, etc.

The structuring or disciplining process envisioned herein involves using a communications and computer system as a platform to listen to commands from users, interpret those commands, establish two-party and multiparty communications links, pass on messages, and store messages and commands, thereby permitting an owner or manager of a group of people to observe and analyze the effectiveness the group's interactions. In a way, it is like the central nervous system of an organism, wherein the organism is a group of people.

One purpose of structuring or disciplining a communication is for associates to become better customer service associates or sales people in a retail setting. The present technology may accomplish this goal by monitoring communications of the users that occur via communication devices. The communications may be monitored to derive context information from the communication such as the name of the user, geographic location of a user, the state or status of the user (e.g., busy, engaged, out-of-range, not logged on, available, etc.), business metrics regarding the user's interaction with others, and commands from the user. The communications may be monitored by a computer system associated with a radio base station that acts as a central hub for the user communications. The computer system may convert audible, voice or speech communications to a text format using standard and well-known techniques. The text may be used to derive the context information from the communication. The computer system may also store some or all of the communication including the time and geographic location of the device, the audible portion of the communication and the text format of the communication. The structured communications may extend beyond a single venue to multiple venues without regard to geographic location.

In one embodiment, the computer system uses the derived context information to determine a destination of the communication and forwards or relays the communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user. The computer system then relays the communication, via the radio base station, to a communication device associated with the third user. The computer system may also convert the communication to text and derive contextual or performance metrics regarding the first or third user. For example, the first user may be an associate in a retail setting and the third user is a customer. The first user may be responding to a query made by the third user. The performance metric may be the length of time it took for the first user to respond to the query or may be whether or not the query was satisfied or may be a different metric entirely. The computer system may derive and store more than one performance metric. The computer system may also access more than one communication regarding a user to determine some metrics.

In one embodiment, the computer system is able to determine the state of the user based on either direct user action such as a button press or voice command; or based on inference from words being spoken, motions, locations or other contextual information. In one embodiment, the third user may be out of range of the radio base station and sends communications via a network associated with the computer system. In one embodiment, the third user may be part of a similar operation to that in FIG. 1A, i.e., another retail outlet for the same company in a different location.

In one embodiment, the computer system is able to determine geographic locations of users based on information received from communication devices associated with the users. The geographic location data may be stored as data associated with a user's communications device at a particular time, or as a performance metric, or may be combined with other information to generate a performance metric. The geographic information may also be used by managers to manage or train associates or to optimize customer service.

A user, as referred to herein, may be a person or people such as, associates, employees, managers, trainees, trainers, customers, emergency responders, personnel, etc. In one embodiment, the user interfaces with a device for communications with other users. Such a device may be a handheld device, a headset, a smartphone, an earpiece, a radio, a computer system, or other device capable of providing communications between users.

A performance metric may also be a metric, a key performance metric or a business metric. A metric or performance metric as referred to herein may be any type of data associated with or derived from a communication between users, including the location of the communications device, or the words spoken and the contextual state at the time of a particular communication event. In one embodiment, the computer system is able to generate a visual representation of metrics. For example, the visual representation may be a map of the geographic location of the users in an environment or may visual demonstrate the availability status of a user. In another example, the visual representation may be textual information such as the number of communications sent by a user or the length of time it took for a user to respond to a communication. The performance metrics may be sent or displayed to a manager or other user for use in making decisions. The performance metrics may be used by the manager to optimize customer service in a retail setting by taking actions such as reprimanding or rewarding an associate or noticing that no associates are located near a group of customers.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

Observation Platform for Using a Structured Communications

With reference now to FIG. 1A, a block diagram of an environment 100 for structuring communications in an observation platform. Environment 100 includes devices 105, 110 and 130, radio base station 115, computer 120, database 125 and network 135. Environment 100 comprises components that may or may not be used with different embodiments of the present technology and should not be construed to limit the present technology. Some or all of the components of environment 100 may be described as an observation platform for structuring a communication.

The present technology makes use of communication devices. Radio base station 115 and devices 105, 110 and 130 may also be described as communication devices. Devices 105, 110 and 130 may be user devices that are mobile and employed by a user to communicate with other users via other devices. Communications between the devices may be described as signals. The devices 105, 110 and 130 may be a smartphone, a personal digital assistant, a fob, a handheld device, a headset or other small electronic device. In one embodiment, devices 105, 110 and 130 employ speakers and microphones with control buttons for audible communications. The control buttons may be push to talk buttons, volume control buttons, and power on/off buttons or other standard buttons and may be options on a touchscreen. Devices 105, 110 and 130 may be handheld, may be worn around the neck, and may be a headset worn on the head or otherwise interface with the human body. Devices 105, 110 and 130 may or may not comprise a screen or display such as a liquid crystal display (LCD). In one embodiment, devices 105, 110 and 130 do not comprise a display such that a user is not inundated with too many options or too much information from the device. A user device without a display may simplify communications and thus a user, such as a customer, may be more likely to employ the device for its intended purpose.

Devices 105, 110 and 130 and other devices in environment 100 may be issued to a user upon entering environment 100 or may be brought by the user into environment 100. For example, in a retail setting associates may be issued devices by the employer or owner of the retailer setting. Customers in the retail setting may also be issued devices as they enter the retail setting. Customers may choose to whether or not to accept the device or whether or not to use the device after accepting it. The associate devices and the customer devices may or may not be the same type or model of devices. Alternatively, the customer may bring a device into the retail setting such as a smartphone. The customer may download an app to the smartphone that will allow the customer to use the device for communications in the store with associates or others in accordance with present technology.

Devices 105, 110 and 130 may be low power devices. The devices may use batteries or solar power including either ambient or battery solar power in a low duty-cycle manner to save power. In one embodiment, the devices have an automatic sleep function when location of the device does not change and no communications are sent or received after a period of time.

Radio base station 115 may be a communication device that is capable of communicating with devices 105, 110 and 130. Radio base station may simply be a component of computer 120 or may be a standalone device that is coupled with, connect to, or otherwise associated with computer 120. Radio base station 115 and computer 120 may be physically adjacent to one another or may be separated by a distance. Computer 120 is able to instantaneously receive communications from radio base station 115 and to send communications to radio base station 115 for radio base station 115 to transmit the communication to its destination. Computer 120 is a computer system with a process and memory and is capable of executing commands, software and firmware. Computer 120 may be a desktop computer, a server computer, or other standard computing system or may be custom built for the present technology.

Radio base station 115 and devices 105, 110 and 130 employ standard techniques for communicating wirelessly. The communications may be performed using radio techniques such as near field communications, short wave radio, Bluetooth, Wi-Fi, standard wireless computer network protocols, etc. Devices 105, 110 and 130 may be able to communicate with each other directly or through radio base station 115. Devices 105, 110 and 130 communicate with each other via the computer system 120. In one embodiment, all communications in environment 100 are relayed through radio base station 115 which acts as a central hub. For example, device 105 may communicate with device 110 by device 105 sending a communication to radio base station 115, computer 120 derives that device 110 is the destination for the communication and relays the communication to device 110. This may occur automatically and quickly enough such that the users will not experience any undue lag in communications. In one embodiment, devices 105, 110 and 130 may communicate directly with computer 120. For example, a user may issue a command to computer 120 via device 105 or computer 120 may send information to device 105. Information send from computer 120 to device 105 may be an audible voice signal or may be textual or graphical data to be displayed at device 105 if it is properly equipped to do so.

In one embodiment, devices 105, 110 and 130 may communicate with one another directly, and their signals may be monitored and processed by computer system 120 via a monitoring system associated with the radio base station 115. Instructions or commands may still be directed towards the computer system 120.

In one embodiment, computer 120 is able to recognize a user sending a communication. The user may be recognized based on the device used to send the communication to computer 120 and radio base station 115. For example, device 105 may have a unique signature associated with its transmissions such that computer 120 can identify differentiate the device from another user. Such recognition of a user may then be employed by computer 120 for future communications with other devices. In one embodiment, the signal or communications between devices are encrypted. The signal may be encoded such that it is unique to a specific device. The encryption or encoding may be employed by computer 120 to recognize the user of the device. In one embodiment, the user may identify himself to the computer system 120 and the computer system 120 makes the association between user name and device 105's internal electronic identification.

Computer 120 may determine that the destination of a communication is a single device or a plurality of devices. Thus computer 120 may relay a communication from device 105 only to device 110 or may relay it to both device 110 and device 130. Computer 120 may determine that another user device is the destination of a communication originated by device 105 but may also directly respond to the communication by executing a command or sending a communication back to device 105. In one embodiment, a communication from device 105 has more than one characteristic or aspect. For example, the communication may have first characteristic that corresponds to an audible source such the voice of a user employing device 105. The communication may also have a second characteristic that comprises geographical position information of device 105 or may have information indicative of a geographic position of device 105. Computer 120 is able to determine a geographic position and direction of motion of a device from the information indicative of a geographic position of device. The motion may also be described as path of travel. A characteristic of the communication may be a portion of the communication, data associated with the communication, attributes of the communication, or metadata regarding the communication.

In one embodiment, computer 120 comprises a storage medium for storing some or all of a communication. Computer 120 may store all communications between devices in environment 100. Computer 120 may store communications for a pre-determined amount of time. Different characteristics of the communication may be stored including portions of the communication itself. For example, the communication may comprise an audible portion, a text portion, information indicative of a geographical position, and a geographical data portion. The audible portion may also be converted to text. Computer 120 may store all or some of the different portions including the portion converted to text. Computer 120 may store geographic position information regarding a device over a period of time such that a path of travel of the user may be inferred. Thus the position of a user may be mapped, tracked or predicted through a physical environment or area.

In one embodiment, computer 120 receives a communication from a device with a portion of the communication that corresponds to a voice of the user of the device. Computer 120 is able to convert the audible portion to text using speech to text techniques. The resulting text may be used by computer 120 to derive context information from the communication to determine performance metrics regarding the communication or the user of the device. The resulting text may also be interpreted as a command for computer 120 to execute. The resulting text may also be employed to determine a destination for the communication.

In one embodiment, each speaker is identified with a unique identifier with each voice file so that the speech-to-text engine can train on the speaker's voice and more accurately choose words from the dictionaries. Individually customized dictionaries may be used for the sequential context of the spoken words. For example, saying, "urgent Bob" is interpreted by looking up the first word in a command dictionary and the second word in a names or places dictionary. In one embodiment, a frequency table is built for each user defining how frequently they call a name or place to improve the probability of selecting the correct word. In one embodiment, if a command, name, or place is not understood, the system may default to the most likely destination group. The user can easily opt out of the default destination and start again. Alternatively, if the command, name or place is not recognized, the computer system 120 may be programmed to default to a simple reply such as "command not recognized" or "person not found."

In one embodiment, computer 120 executes a command received from device 105. The command may be directly received from device 105 or may be received in an audible voice signal with is converted to text and then interpreted to be a command for computer 120. The command may be to initiate a virtual voice connection between device 105 and device 110. The command may be to initiate a connection to a telephony system such that a user of device 105 may communicate with another user who is employing a telephone for communication. The command may be for computer 120 to access database 125.

In one embodiment, computer 120 is able to access database 125 over network 135. Network 135 may be a local area network, a wireless network, the Internet or another computer network. In one embodiment, database 125 is a component part of computer 120 and network 135 is not required for computer 120 to access database 125. Database 125 may comprise an inventory of product or any other type of information. For example, in a retail setting a customer may use a device to communicate with an associate regarding whether the retail setting has a particular product in stock. The associate may use key terms to query computer 120 regarding whether the product is in stock. Computer 120 may convert the associate's voice to text and recognize the command regarding whether the product is in stock. Computer 120 then queries database 125 and sends a response back to the associate and/or customer. The response may be sent back using an audible signal or a signal to be displayed on a screen at the user device. Similar examples may be constructed around product location databases, workforce scheduling system, time clock systems or other information systems used for operations. Alternatively, computer 120 may recognize a command based on the converted text without a user saying key terms.

Database 125 may be a local inventory or a larger inventory. In one embodiment, database 125 is not an inventory but comprises different data. For example, a user may employ the device to communicate with and command computer 120 to perform a key word search of the Internet using a search engine such as a website search engine.

Figure 1B:
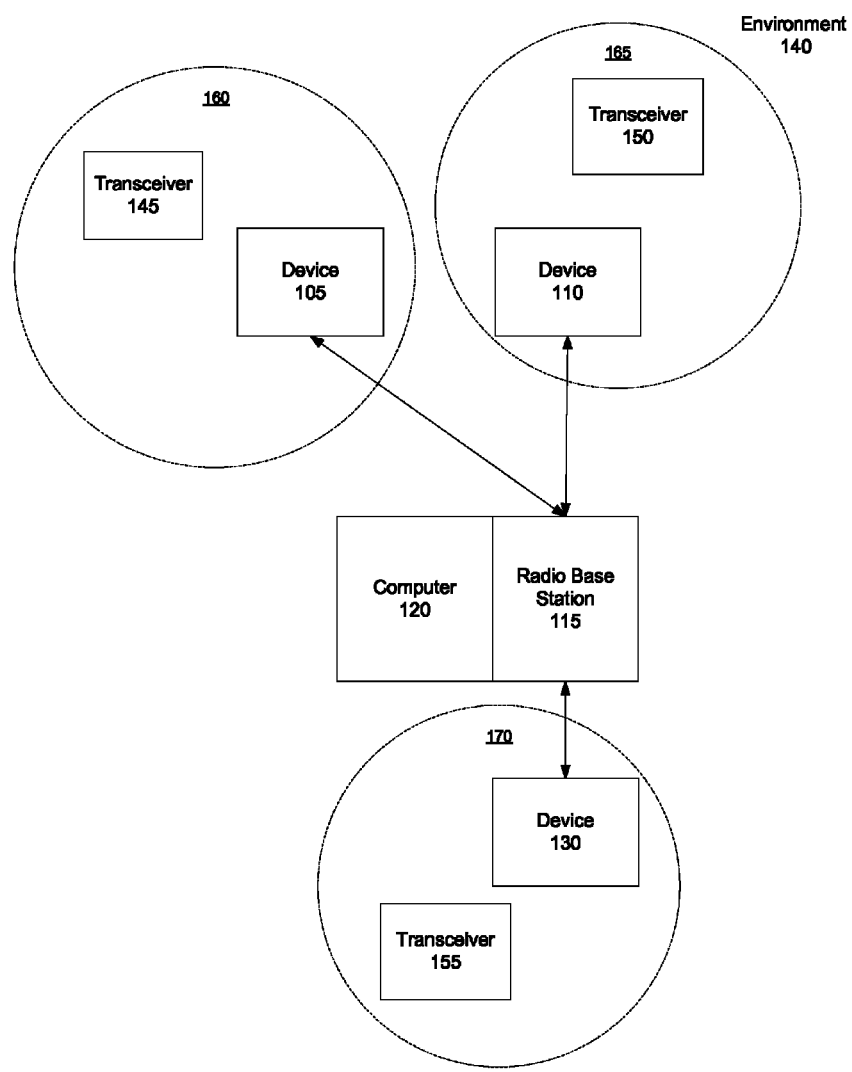
FIG. 1B illustrates a block diagram of an example environment for an observation platform for structuring a communication in accordance with other embodiments of the present technology.

With reference now to FIG. 1B, a block diagram of an environment 140 for structuring communications in an observation platform. Environment 140 includes devices 105, 110 and 130, radio base station 115, computer 120, transceivers 145, 150, and 155, and regions 160, 165, and 170. Environment 140 comprises components that may or may not be used with different embodiments of the present technology and should not be construed to limit the present technology. Some or all of the components of environment 140 may be described as an observation platform for structuring a communication.

Transceivers 145, 150, and 155 are capable of sending and receiving signals to and from radio base station 115 and devices 105, 110 and 130. Transceivers 145, 150, and 155 may or may not be networked to one another and to either radio base station 115, computer 120 or both. Transceivers 145, 150, and 155 may be transceivers such as wireless routers in a computing network. The transceivers may relay a communication from a user device to computer 120. A communication or signal may be routed through a plurality of transceivers before reaching computer 120.

In one embodiment, the transceivers may be uniquely identifiable such that a communication may comprise a characteristic that identifies the communication as being routed through a given transceiver. This identification of the transceiver may be employed by computer 120 to determine a geographic location of a device or user. Thus, a characteristic of the communication may be an identity of a transceiver and comprises information that is indicative of a geographic position. Computer 120 may determine that a device is in a geographic region that is associated with a transceiver such as region 160 associated with transceiver 145. Computer 120 may also use geographic information and user motion characteristics to predict and pre-set association to the next likely transceiver.

In one embodiment, computer 120 determines the geographic location of a device based on a transceiver signal strength received at the device from one or more transceivers. For example, device 130 may receive signals from both transceivers 150 and 155 each with a corresponding signal strength. The signal strength data is sent from device 130 to computer 120 as a characteristic of a signal or communication sent to computer 120. The signal strength data is then used by computer 120 to determine the geographic position of device 130.

Transceivers 145, 150, and 155 each have an associated region such as regions 160, 165, and 170. The regions may define the transmission range of the transceiver or may be defined based on some other criteria. In one embodiment, the regions may be described as wireless hotspots. Regions 160, 165 and 170 may be well defined geographical regions either indoors or outdoors and me be known to computer 120. Regions 160, 165 and 170 are depicted as not overlapping one another. However, the regions may or may not overlap one another. In one embodiment, computer 120 may determine the geographic location of a device based on its location in one or more regions. For example, device 105 may be located in region 160. In another example, regions 160 and 165 may be overlapping and computer 120 determines that device 110 is in the overlapping portions of region 160 and 165 because a characteristic of a communication from device 110 indicates that device 110 is receiving signals from both transceiver 145 and 150. Thus a characteristic of signal sent from a user device to computer 120 may be contents of a communication, a portion of a communication corresponding to an audible source, signal strength data of a transceiver, an identity of a transceiver, geographic position data, or other information.

In one embodiment, computer 120 determines the geographic motion, movement, or path of travel of a user based on transceiver signal strengths received at the device from one or more transceivers. Movement of the communications device 130 may be derived from data regarding signal strength measurements made at one or more of the transceivers, where the signal strength is measured and sampled at successive time intervals, via well-known methods. For example, as a user moves about the region in environment 140, the signal strength will increase at one transceiver device and decrease at another. Movement of the communications device 130 may also be derived from internal components in the device called accelerometers, again via successive time samples of acceleration data. This data may be used to detect a smaller range of movement.

Figure 1C:
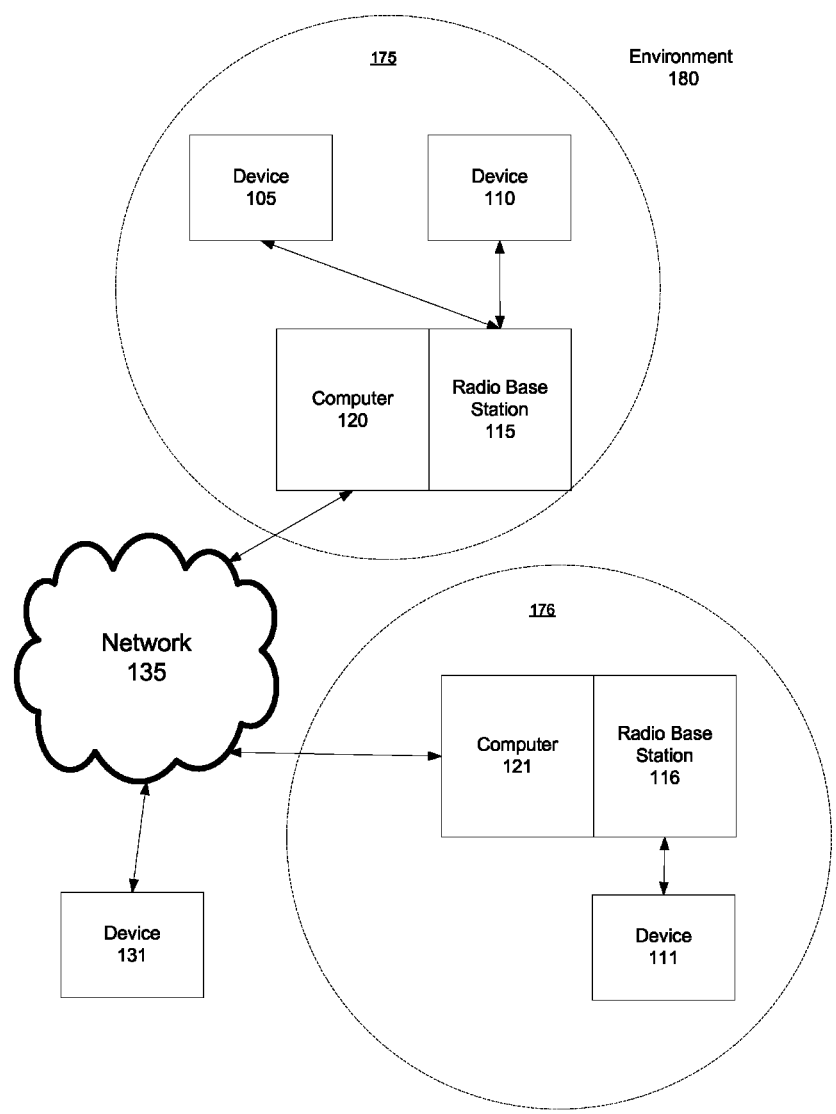
FIG. 1C illustrates a block diagram of an example environment for an observation platform for structuring a communication in accordance with other embodiments of the present technology.

With reference now to FIG. 1C, a block diagram of an environment 180 for structuring communications in an observation platform. Environment 180 includes devices 105, 110, 111 and 131, radio base stations 115 and 116, computers 120 and 121, network 135 and regions 175 and 176. Environment 180 comprises components that may or may not be used with different embodiments of the present technology and should not be construed to limit the present technology. Some or all of the components of environment 180 may be described as an observation platform for structuring a communication.

In one embodiment, device 105 and 110 are located within region 175. The components depicted within region 175 may be described as an observation platform. Region 175 may be described as a radio range. For example, radio base station 115 may have a physical limit regarding the distance which it may transmit radio signals. Therefore, a device outside of the radio range, such as devices 131 or 111 will not be able to communicate with computer 120 via a radio signal transmitted from radio base station 115. Additionally, devices 105, 110, 111 and 131 may also have a limited radio range.

These limitations may be overcome by computer 120 relaying the communication to either device 131 or a second observation platform within region 176 via network 135. Therefore, devices 105 and 110 may communicate with either device 111 or 131 where the communications are relayed by computer 120 and network 135. Region 176 may be described as a second observation platform with components that are duplicates of or similar to components of region 175. The regions 175 and 176 may comprises any number of communication devices or other components such computers, routers, and transceivers. Thus, the present technology provides for structured or disciplined communications between at least two user devices that may or may not be within radio range of one another.

In one embodiment, the communications between computer 120 and devices 105 and 110 are accomplished via radio signals and the communications between device 131 and computer 120 are accomplished via network 135. In one embodiment, the connected between network 135 and device 131 is telephony call such that device 105, which may not be a telephone, places a phone call to device 131, which is a telephone, via the observation platform. In such an embodiment, network 135 may comprise both a computer network and a phone network or cloud.

In one embodiment, device 131 and/or region 176 may be physically remote relative to radio base station 115. For example, all the components shown within region 175 may be located within radio range of one another at a first location, but device 131 and region 176 are located at a second and third location outside of region 175. These first, second and third locations may be separated by any length of distance. The second or third location may be hundreds or even thousands of miles away from the first location or may be less than a mile away but still outside of region 175. In one embodiment, computer 120 and radio base station 115 are located at a first physical address such as a street address for a building or other physical location, device 131 is located at a second physical address, and computer 121 and radio base station 116 are located at a third physical address.

In one embodiment, computer 120 and radio base station 115 are associated with a retail environment and region 175 includes the retail floor as well as an office or other area designated for associates, managers, or employees of the retail environment. However, computer 121 and radio base station 116 are located in region 176 are located at a second retail environment. The first and second retail environments may be related to one another such as both being a franchise of the same business or enterprise. Thus, a customer or associate may be located in region 175 associated with a first franchise, e.g. a first observation platform, and speak with an associate using device 111 in a second franchise, e.g. a second observation platform. The customer or associate may ask questions regarding the inventory of an item at the second franchise or speak with an associate at the second franchise that has not knowledge not known by associates at the first franchise.

Figure 2:
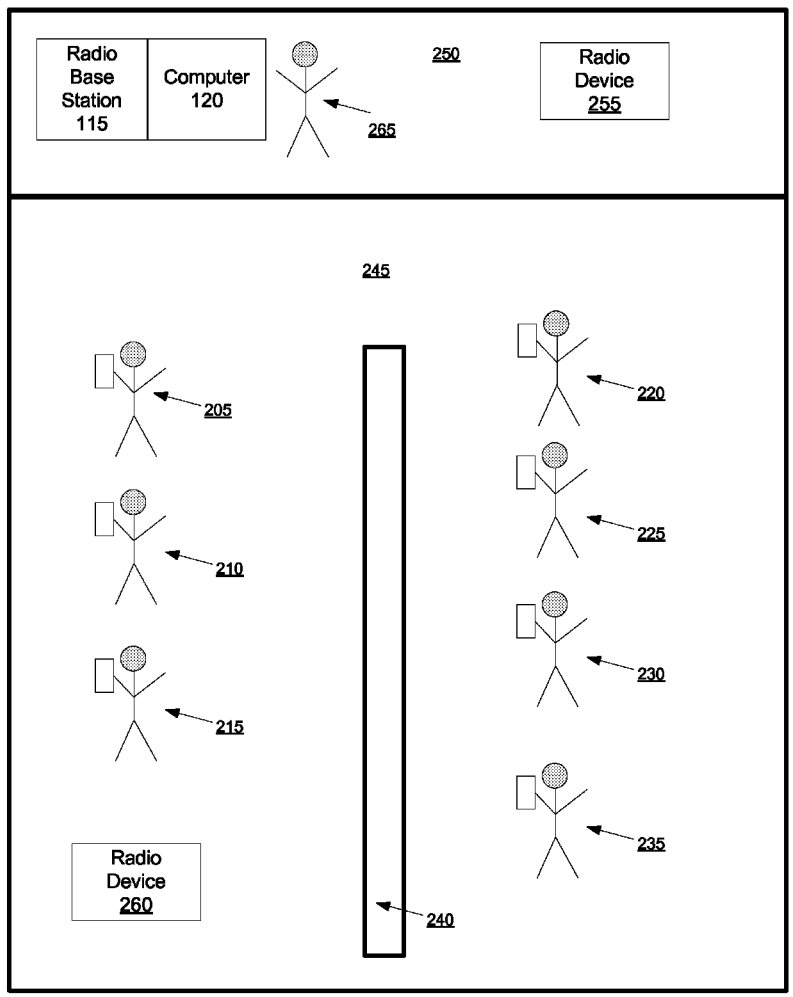
FIG. 2 illustrates a block diagram of an example environment for structuring communication in an observation platform in accordance with embodiments of the present technology.

With reference now to FIG. 2, a block diagram of an environment 200 for structuring communications in an environment. Environment 200 includes radio base station 115, computer 120, users 205, 210, 215, 220, 225, 230, and 235, structure 240, area 245, area 250, radio devices 255 and 260 and user 265. Environment 200 comprises components that may or may not be used with different embodiments of the present technology and should not be construed to limit the present technology.

Environment 200 depicts a setting in which the present technology may be employed. Environment 200 may be, but is not limited to, retail settings, public-stage floors, outdoor venues, concerts, police scenarios, disaster areas, and other environments where communications occur between users. Areas 245 and 250 are depicted as being enclosed. However, the present technology may be implemented in an outdoor or indoor environment or a combination of the two. Users 205, 210, 215, 220, 225, 230, and 235 are depicted as each holding a device such as device 105 of FIG. 1. The devices do not necessarily need to be handheld. Users 205, 210, 215, 220, 225, 230, and 235 may be a variety of different types of users. For example, the users may be associates and customers intermingled in a retail setting. Area 245 may be the retail floor while area 250 is a back office or other area designated for associates, managers, or employees of the retail environment.

Structure 240 may be a display, shelves, aisle divider, or other structure that physically separates spaces in area 245. For example, users 205, 210, and 215 are depicted as being in separate space of area 245 than users 220, 225, 230, and 235. Computer 120 may be able to interact with users 205, 210, 215, 220, 225, 230, and 235 and determine the user's geographic locations as well as act as a central hub for all communications between the users. In one embodiment, computer 120 recognizes a group of users associated with communication devices. The group may be based on a classification or type of user or may be based on a location of said users. In one example, computer 120 recognizes that users 205, 215, 230, and 235 are associates and users 210, 220, and 225 are customers in a retail setting. The associates may be considered a first group and the customers a second group. In a second example, computer 120 recognizes that users 205, 210, and 215 are a first group in a separate space of area 245 than the second group of users 220, 225, 230, and 235. Computer 120 may then employ the recognition of groups to generate visual representations of features of the group and its communications. It should be appreciated that groups can simultaneously exist in many locations and are not constrained by building walls or geography.

In one embodiment, environment 200 comprises radio devices 255 and 260 used for communication with user devices and radio base station 115. Radio devices 255 and 260 may or may not be networked with radio base station 115 to provide additional coverage or range for radio base station 115. For example, radio devices 255 and 260 may be antennas or radio repeaters for radio base station 115. In one embodiment, radio devices 255 and 260 are wireless routers for computer networking. Computer 120 may employ radio devices 255 and 260 to determine a geographic location of a user. Radio devices 255 and 260 and transceivers 145, 150 and 155 may each have the same capabilities and features as one another.

The geographic location or position of a user may be determined by computer 120 receiving clues or evidence of the geographic location of the user device and then computer 120 infers or deduces the geographic location based on the evidence or clues. In other words, user 205 may send a communication to computer 120 via a user device where a characteristic of the communication is indicative of the geographic location. For example, the user device associated with user 205 may receive a plurality of signals from radio base station 115 and radio devices 255 and 260. Each signal has a unique signal strength at the current position of user 205. The signal strengths of each source are sent to computer 120 as a characteristic of the communication. Computer 120 may then determine the geographic position of user 205 based on the signal strengths of each source and the known location of the sources e.g. radio base station 115 and radio devices 255 and 260. In one embodiment, the user device knows its geographic position based on geographic position component which is part of the user device. The geographic position component may be a component device or chip that employs the global positing system or other satellite navigation system for determining a geographic location or position. A user device with a geographic position component may transmit the determined geographic position to computer 120 as part of a communication. Thus computer 120 may know the location of a user at a given time based on the geographic position of the device associated with the user.

In one embodiment, user 265 interfaces with computer 120 to use the present technology to optimize communications. Computer 120 may determine and display performance metrics or visual representations regarding communications to user 265. User 265 may then use the performance metrics and visual representations to make decisions. For example, user 265 may be a manager of associates and can identify that a customer has asked for assistance at a given location but no associates have responded. The manager may then use the present technology to request an associated to assist the customer. In one embodiment, user 265 is able to directly use computer 120 and radio base station 115 to communicate with other users.

In one embodiment, user 265 interfaces with computer 120 to use the present technology to optimize geographic location. User 265 may be a customer and requests help from computer 120. Computer 120 determines the associate nearest the location of user 265 and provides the current and updated location of user 265 until intercepted by the associate.

In one embodiment, computer 120 derives performance metrics, business metric or metric from the communications between users. The metrics may be used to generate visual representations. The metrics and/or visual representations may be employed to make decisions. The metrics and visual representations may be sent to another computer system or device. A metric may be based on the behavior of a user and the user's communications.

A sales performance metric may be determined by linking sales with users, measuring busy times of users, and ascertaining busy status of user. The busy status of a user may indicate that the user is engaged in a communication, a task, assisting a customer or otherwise occupied. A response time metric may also be determined by measuring the time it takes to answer a user's question, or how long it takes to receive assistance after asking for it. A customer satisfaction metric may also be derived based on the text of the customer's communication. A task performance metric may be determined by measuring the length of time an associate is currently engaged in performing said task, including noting pending and completed tasks. Metrics may be used by a manager to make reward good behavior or correct undesired behavior. Additionally, because the communications have been recorded, the communications may be used in training as examples.

Visual representations may be described as communication traffic intensity maps between users and/or groups such as who talks to whom, how frequently and at what time of day; who asks questions and who responds; who responds to tasks, when and how long it took to respond; and who has listened to which training podcasts, where they listened and when. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, and analyzed, providing a great deal of useful information to any manager of the overall process.

Operations of Using Structured Communications in an Observation Platform

Figure 3:
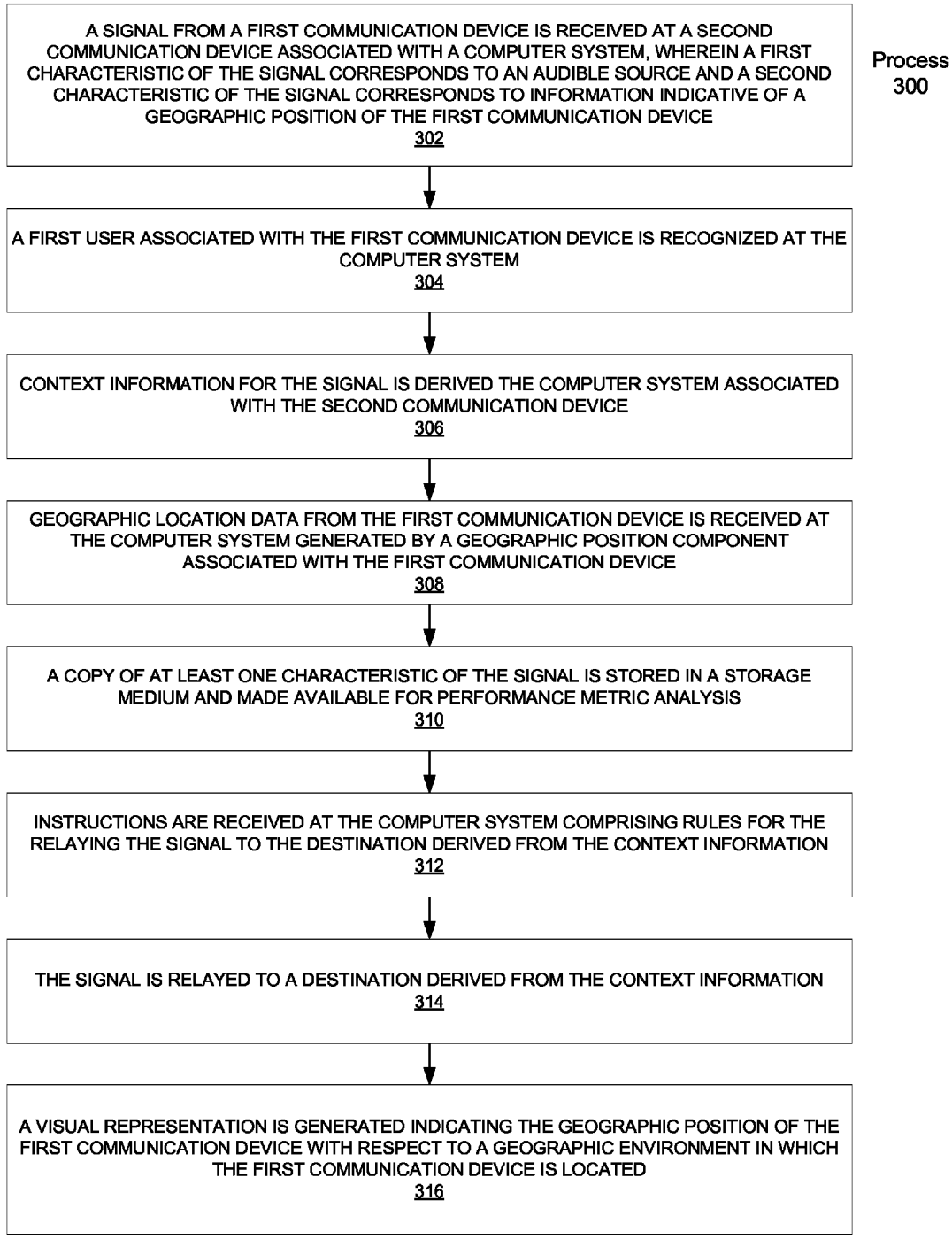
FIG. 3 illustrates a flowchart of an example method for structuring communication in an observation platform in accordance with embodiments of the present technology.

FIG. 3 is a flowchart illustrating process 300 for using structured communication in an observation platform in accordance with one embodiment of the present technology. Process 300 may also be described as disciplining communications in an observation platform. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 300 is performed by the components of FIG. 1A, 1B, 1C or 2. In one embodiment, the methods may reside in a computer usable storage medium having instructions embodied therein that when executed cause a computer system to perform the method.

At 302, a signal from a first communication device is received at a second communication device associated with a computer system, wherein a first characteristic of the signal corresponds to an audible source and a second characteristic of the signal corresponds to information indicative of a geographic position of the first communication device. For example, the audible source may the voice of a user.

At 304, a first user associated with the first communication device is recognized at the computer system.

At 306, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query.

In one embodiment, the context information is a command and the command may be issued verbally by a user in a communication. For example, a user may speak into a communication device the phrase "hello everybody" thus the communication is the spoken phrase and the computer system may derive context information that the communication is to be sent to everybody. The computer system then relays the signal to everybody associated with the communication observation platform. In another example, the communication may be the phrase "hello Bob." The computer system derives context information that the destination of the communication is Bob; the communication is then relayed only to Bob.

The Table below shows examples of Communication Phrases and Derived Context information.

| Communication Phrase | Derived Context Information |
| --- | --- |
| "Hello everybody" | The communication is to be relayed to "everybody" |
| "Hello Bob" | The communication is to be relayed to "Bob" |
| "Hello Workshop" | The communication is to be relayed to everyone associated with the "Workshop" location. |
| "Urgent Bob" | The communication is an urgent communication to be relayed to "Bob" |
| "Now here this" | The communication is to be relayed to "everyone" as a bulletin |
| "Selling tip for the side hallway" | The communication is to be relayed to those associated with the side hallway as a bulletin |
| "Where is Steve" | The communication is a command to determine a geographic location of Steve and to send a message back to the communication device from the computer system that speaks the response. The response may also include contextual information such as "Steve is available" or Steve is engaged" or other information from other sources such as "Steve is on break." |
| "Who is near the central hallway" | The communication is a command to determine who is geographically located near the central hallway region and to send a message back to the communication device from the computer system that speaks the response. |
| "Test go to simple menu" | The communication is a command for the computer system to go to the simple menu and to send a message back that speaks the phrase "you will now go to simple menu" |
| "Where is everybody" | The communication is a command to determine where everyone associated with the communication platform is geographically located and to send a message back to the communication device from the computer system that speaks the response. |
| "Announcement Side Hallway" | The communication is a command to play an announcement to any user upon entering the geographic area of the side hallway. |

The phrase "test go to simple menu" may be a command to enter a simple menu. Once in the simple menu the user may issue other commands via verbal communications to add or drop items using phrases such as "test drop Kitchen" or "test add Kitchen." The user can then issue a command to enter the fancy menu using the phrase "test go to fancy menu."

At 308, a geographic location of the first communication device is determined based on the second characteristic of the signal and at least one other source of information.

At 310, a copy of at least one characteristic of the signal is stored in a storage medium and is made available for performance metric analysis. In one embodiment, the performance metrics are key performance metrics. The at least one characteristic may be, but is not limited to, a message, a voice, a location, a signal strength, a type of message, text corresponding to a message, and an identity of a router that the signal was routed through.

At 312, instructions are received at the computer system comprising rules for the relaying the signal to the destination derived from the context information. The rules may instruct to whom and to how the communication is to be relayed. For example, context information derived from a communication may command that the communication be sent to everyone associated with the geographic location of "Workshop." However, the rules may instruct that the communication is only relayed to those associated with the "Workshop" who are designated as available or not busy. The rules may also comprise a predetermined time or a lifetime in which a response may be relayed to an available communication device.

At 314, the signal is relayed to a destination derived from the context information. The destination may be another user or a plurality of user or the computer system itself. The destination may be located outside of a radio range associated with the second communication device or be otherwise physically remote relative to the second communication device.

At 316, a visual representation is generated indicating the geographic position of the first communication device with respect to a geographic environment in which the first communication device is located. For example, the visual representation may be a map depicting the location of users or where users have been. The visual representation may include a status indicator of the user such as whether the user is busy or available.

Figure 4:
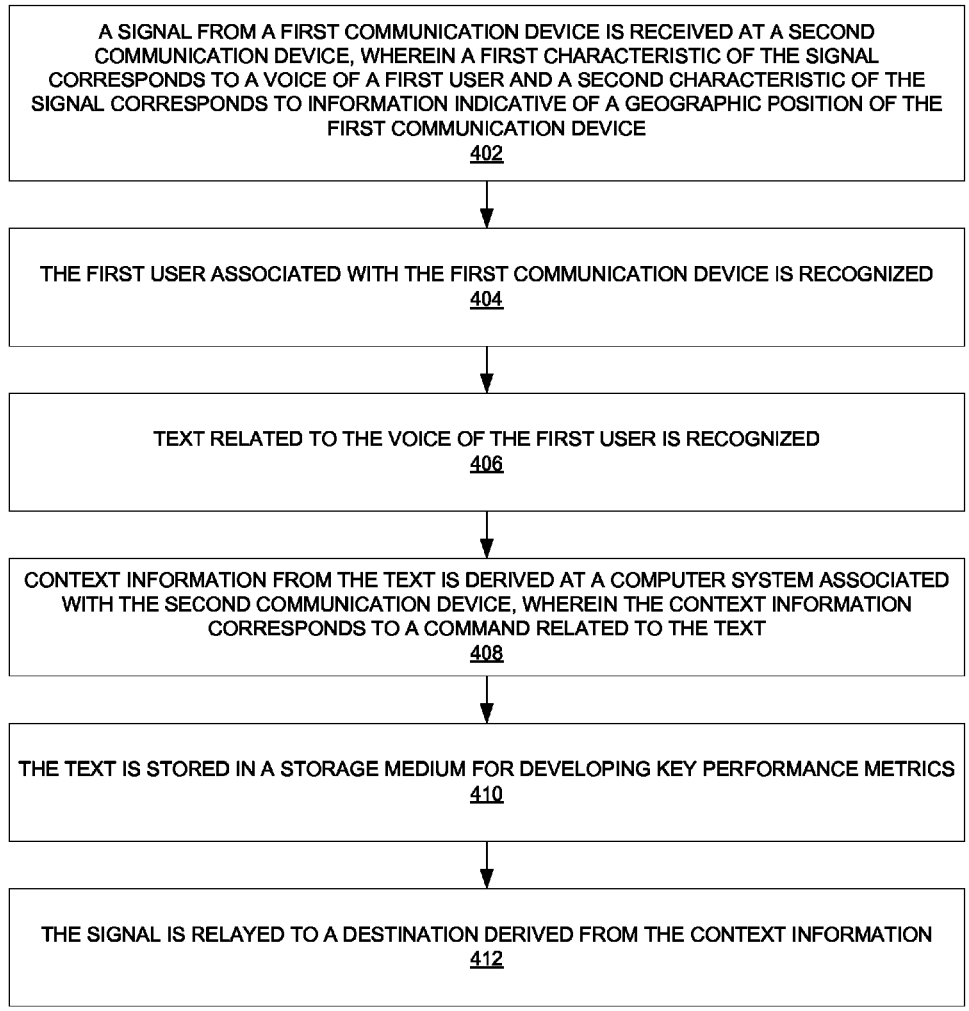
FIG. 4 illustrates a flowchart of an example method for disciplining communications in accordance with embodiments of the present technology.

FIG. 4 is a flowchart illustrating process 400 for using a structured communication in an observation platform in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 400 is performed by the components of FIG. 1A, 1B, 1C or 2. In one embodiment, the methods may reside in a computer usable storage medium having instructions embodied therein that when executed cause a computer system to perform the method.

At 402, a signal from a first communication device is received at a second communication device, wherein a first characteristic of the signal corresponds to a voice of a first user and a second characteristic of the signal corresponds to information indicative of a geographic position of the first communication device.

At 404, the first user associated with the first communication device is recognized.

At 406, text related to the voice of the first user is recognized.

At 408, context information from the text is derived at a computer system associated with the second communication device, wherein the context information corresponds to a command related to the text.

At 410, the text is stored in a storage medium for developing performance metrics.

At 412, the signal is relayed to a destination derived from the context information. The destination may be located outside of a radio range associated with the second communication device or be otherwise physically remote relative to the second communication device.

Figure 5:
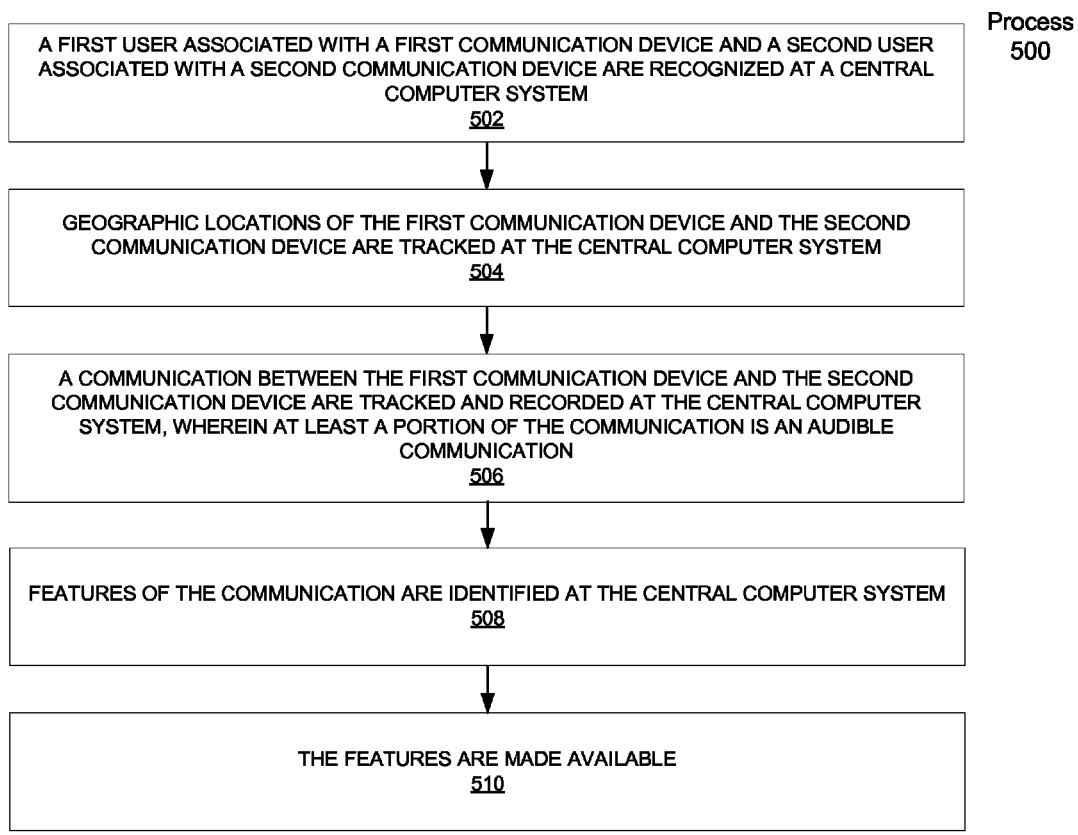
FIG. 5 illustrates a flowchart of an example method for observing and recording users of communication devices in accordance with embodiments of the present technology.

FIG. 5 is a flowchart illustrating process 500 for observing and recording users of communication devices in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 500 is performed by the components of FIG. 1A, 1B, 1C or 2. In one embodiment, the methods may reside in a computer usable storage medium having instructions embodied therein that when executed cause a computer system to perform the method.

In one embodiment, process 500 is a management observation tool for keeping track of mobile human resources and collecting data on their activities.

At 502, a first user associated with a first communication device and a second user associated with a second communication device are recognized at a central computer system.

At 504, geographic locations of the first communication device and the second communication device are tracked at the central computer system. In one embodiment, tracking means storing data about location and any spoken information.

At 506, a communication between the first communication device and the second communication device are tracked and recorded at the central computer system, wherein at least a portion of the communication is an audible communication.

At 508, features of the communication are identified at the central computer system. Features may be described as characteristic or data regarding the communication itself. The features may be availability of a user, location of a user, communication history of the user, context of the communication, and a classification of the communication.

At 510, the features are made available to a manager for making a decision.

Figure 6:
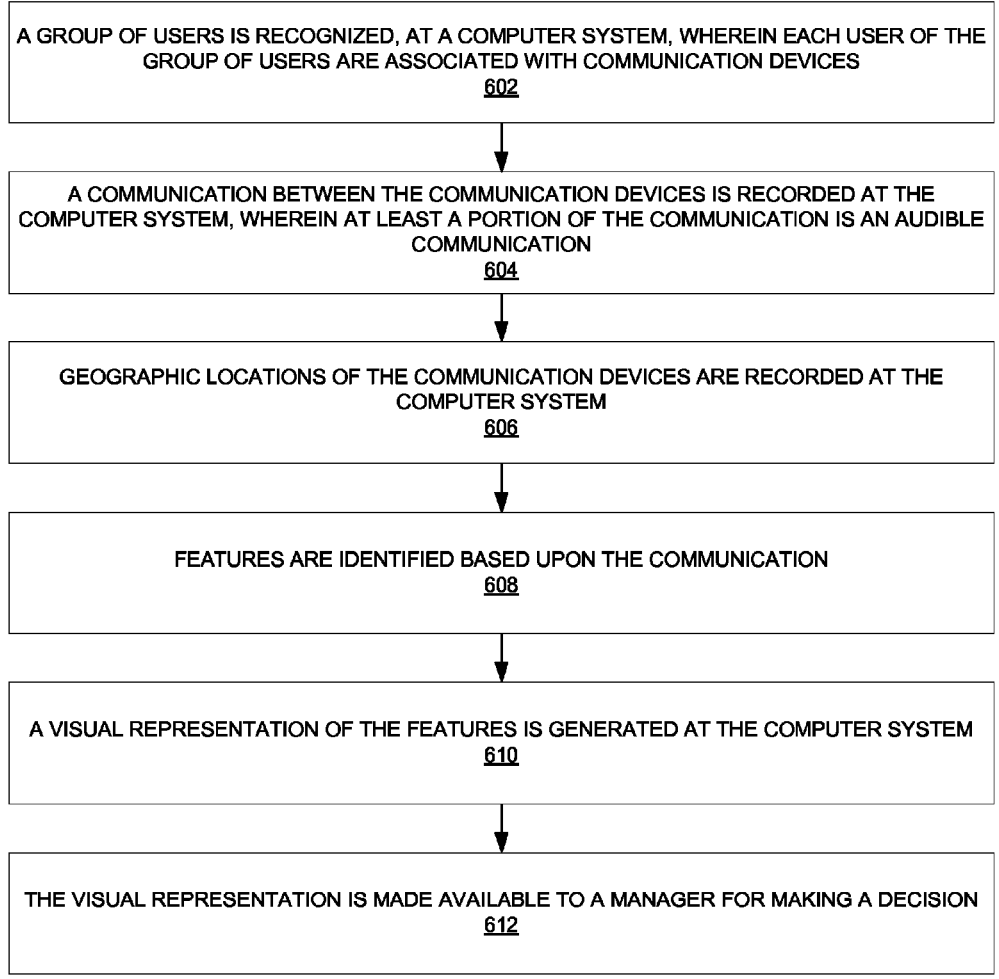
FIG. 6 illustrates a flowchart of an example method for characterizing communications in a group of users in accordance with embodiments of the present technology.

FIG. 6 is a flowchart illustrating process 600 for characterizing communications in a group of users in accordance with one embodiment of the present technology. In one embodiment, process 600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 600 is performed by the components of FIG. 1A, 1B, 1C or 2. In one embodiment, the methods may reside in a computer usable storage medium having instructions embodied therein that when executed cause a computer system to perform the method.

At 602, a group of users is recognized, at a computer system, wherein each user of the group of users are associated with communication devices. The group of users may be recognized based on a classification of the user or a geographic location of the users. For example, a classification of the users may be whether the user is an associate or a customer in a retail setting.

At 604, a communication between the communication devices is recorded at the computer system, wherein at least a portion of the communication is an audible communication. In one embodiment, at least a portion of the communication is a pre-recorded audible communication.

At 606, geographic locations of the communication devices are recorded at the computer system. The location may be determined based on clues or evidence sent with the communication indicative of the location.

At 608, features are identified based upon the communication. Features may be described as characteristic or data regarding the communication itself. The features may be availability of a user, location of a user, communication history of the user, context of the communication, a classification of the communication, a frequency of communications between two users, a length of a communication, and a response time to a communication.

At 610, a visual representation of the features is generated at the computer system. The visual representation may depict when a user of said group of users is engaged in said communication, when a user of said group of users asks a question in said communication, where said each user of said group of users are located, and where said group of users are not located.

At 612, the visual representation is made available to a manager for making a decision.

Figure 7:
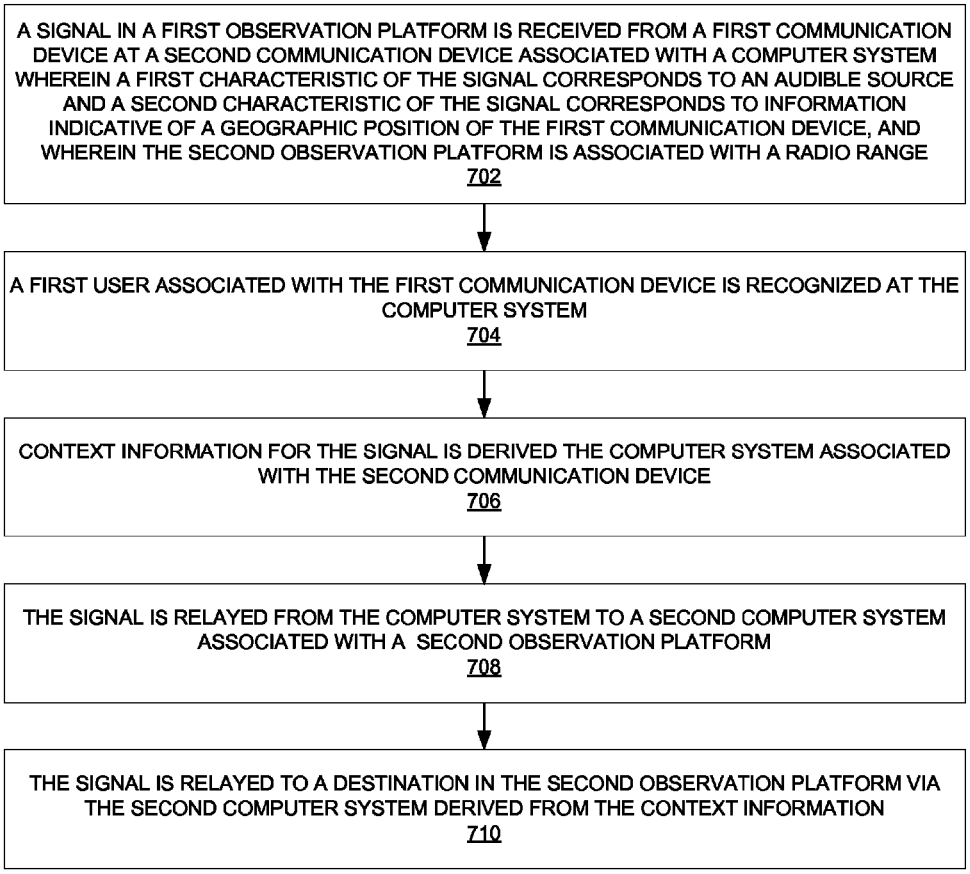
FIG. 7 illustrates a flowchart of an example method for structuring communication in a plurality of observation platforms in accordance with embodiments of the present technology.

FIG. 7 is a flowchart illustrating process 700 for using structured communication in a plurality of observation platforms in accordance with one embodiment of the present technology. Process 700 may also be described as disciplining communications in an observation platform. In one embodiment, process 700 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 700 is performed by the components of FIG. 1A, 1B, 1C or 2. In one embodiment, the methods may reside in a computer usable storage medium having instructions embodied therein that when executed cause a computer system to perform the method.

At 702, a signal in a first observation platform is received from a first communication device at a second communication device associated with a computer system wherein a first characteristic of the signal corresponds to an audible source and a second characteristic of the signal corresponds to information indicative of a geographic position of the first communication device, and wherein the second observation platform is associated with a radio range.

At 704, a first user associated with the first communication device is recognized at the computer system.

At 706, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query.

At 708, the signal is relayed from the computer system to a second computer system associated with a second observation platform via a computer network At 710, the signal is relayed to a destination in the second observation platform via the second computer system derived from said context information.

It should be appreciated that processes 300, 400, 500, 600 and 700 need not carry out each of the described steps to complete its operation. Nor do the steps need to be carried out in the order described.

Example Computer System Environment

Portions of the present technology are composed of computer-readable and computer-executable instructions that reside, for example, in computer-usable media of a computer system or other user device. Described below is an example computer system or components that may be used for or in conjunction with aspects of the present technology.

It is appreciated that that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for using structured communications in an observation platform, comprising:

receiving a signal from a first communication device at a second communication device associated with a computer system wherein a first characteristic of said signal corresponds to an audible source and a second characteristic of said signal corresponds to information indicative of a geographic position of said first communication device, and wherein said second communication device is associated with a radio range;

recognizing a first user associated with said first communication device at said computer system; and deriving context information for said signal at said computer system; and relaying said signal to a destination derived from said context information via a network, wherein said destination is outside of said radio range of said second communication device.

2. The method as recited in claim 1, wherein said first communication device is located within said radio range associated with said second communication device.

3. The method as recited in claim 1, wherein said destination is physically remote from said second communication device.

4. The method as recited in claim 1, wherein said destination is a telephony system enabling said first communication device to make a call to a third party.

5. The method as recited in claim 1, further comprising:
storing a copy of at least one characteristic of said signal in a storage medium, wherein said copy of at least one characteristic of said signal is available for performance metric analysis.

6. The method as recited in claim 1, further comprising:
wherein said audible source is a voice of said first user;
recognizing text related to said voice; and
wherein said context information corresponds to a command related to said text.

7. The method as recited in claim 6, further comprising:
executing said command related to said text.

8. The method as recited in claim 6, wherein said command is defined to initiate a virtual voice connection between said first communication device and a third communication device and wherein said destination is said third communication device.

9. The method of claim 1, wherein said second characteristic of said signal is a signal strength of a transceiver in communication with said first communication device and wherein said deriving said context information comprises deriving said geographic location of said first communication device based on said signal strength of said transceiver.

10. The method of claim 1, wherein said second characteristic of said signal is a plurality of signal strength characteristics transmitted from a plurality of transceivers detected by said first communication device and wherein said deriving said context information comprises deriving said geographic location of said first communication device based on said plurality of signal strength characteristics of said plurality of transceivers.

11. The method of claim 1, wherein said second characteristic of said signal is an identity of a transceiver in communication with said first communication device and wherein said deriving said context information comprises deriving said geographic location of said first communication device based on region associated with said transceiver.

12. A non-transitory computer-usable storage medium having instructions embodied therein that when executed cause a computer system to perform a method for using structured communications in an observation platform, said method comprising:
receiving a signal from a first communication device at a second communication device associated with a computer system wherein a first characteristic of said signal corresponds to an audible source and a second characteristic of said signal corresponds to information indicative of a geographic position of said first communication device, and wherein said second communication device is associated with a radio range;
recognizing a first user associated with said first communication device at said computer system; and
deriving context information for said signal at said computer system; and
relaying said signal to a destination derived from said context information via a network, wherein said destination is outside of said radio range of said second communication device.

13. A method for using structured communications in a plurality of observation platforms, comprising:
receiving a signal in a first observation platform from a first communication device at a second communication device associated with a computer system associated with said first observation platform wherein a first characteristic of said signal corresponds to an audible source and a second characteristic of said signal corresponds to information indicative of a geographic position of said first communication device, and wherein said first observation platform is associated with a radio range;
recognizing a first user associated with said first communication device at said computer system;
deriving context information for said signal at said computer system; and
relaying said signal from said computer system to a second computer system associated with a second observation platform via a computer network; and
relaying said signal to a destination in said second observation platform via said second computer system wherein said destination is derived from said context information.

14. The method of claim 13, wherein said first observation platform is physically remote from said second observation platform.

15. The method of claim 13, wherein said first observation platform is located at a first physical address and said second observation platform is located at a second physical address.

16. The method as recited in claim 13, wherein said first communication device is located within said radio range and said second observation platform is located outside of said radio range.

17. The method as recited in claim 13, wherein said destination is a telephony system enabling said first communication device to make a call to a third party.

18. The method as recited in claim 13, further comprising:
storing a copy of at least one characteristic of said signal in a storage medium, wherein said copy of at least one characteristic of said signal is available for performance metric analysis.

19. The method as recited in claim 13, further comprising:
wherein said audible source is a voice of said first user;
recognizing text related to said voice; and
wherein said context information corresponds to a command related to said text.

20. The method as recited in claim 19, further comprising:
executing said command related to said text.

21. The method as recited in claim 19, wherein said command is defined to initiate a virtual voice connection between said first communication device and a third communication device and wherein said destination is said third communication device.

22. The method of claim 13, wherein said second characteristic of said signal is a plurality of signal strength characteristics detected from a plurality of transceivers in communication with said first communication device and wherein said deriving said context information comprises deriving said geographic location of said first communication device based on said plurality of signal strength characteristics of said plurality of transceivers.

* * * * *